March 3, 1970 CHI SHENG KUO 3,498,752
APPARATUS FOR EXOTHERMIC CATALYTIC REACTIONS
Filed Oct. 26, 1966 4 Sheets-Sheet 1

CHI S. KUO
INVENTOR.

BY J.T. Chabot
AGENT

CHI S. KUO
INVENTOR.

BY J. T. Chalety
AGENT

CHI S. KUO
INVENTOR.

CHI S. KUO
INVENTOR.

United States Patent Office 3,498,752
Patented Mar. 3, 1970

3,498,752
APPARATUS FOR EXOTHERMIC CATALYTIC
REACTIONS
Chi Sheng Kuo, Mount Kisco, N.Y., assignor to Chemical Construction Corporation, New York, N.Y., a corporation of Delaware
Filed Oct. 26, 1966, Ser. No. 589,563
Int. Cl. B01j 9/04
U.S. Cl. 23—289                                15 Claims

ABSTRACT OF THE DISCLOSURE

Apparatus is provided for exothermic catalytic reactions, in which the fluid feed stream is divided into a plurality of portions which are passed in parallel through catalyst beds of a first group arranged in vertical series. The resultant hot reacted fluid stream is quenched by direct injection of cold bypass feed fluid, followed by division of the quenched fluid stream into a plurality of portions, each of which is passed in parallel through a catalyst bed of a second group which is arranged in vertical series below the first group, so that the entire first and second catalyst bed groups are arranged in vertical series within a high pressure retention container or shell. An apparatus for collecting reacted gas below a catalyst bed is provided, which features a plurality of radial horizontal passages or channels provided with foraminous upper and side walls, with inert particulate material being disposed in the sectors between passages.

Figure 1:
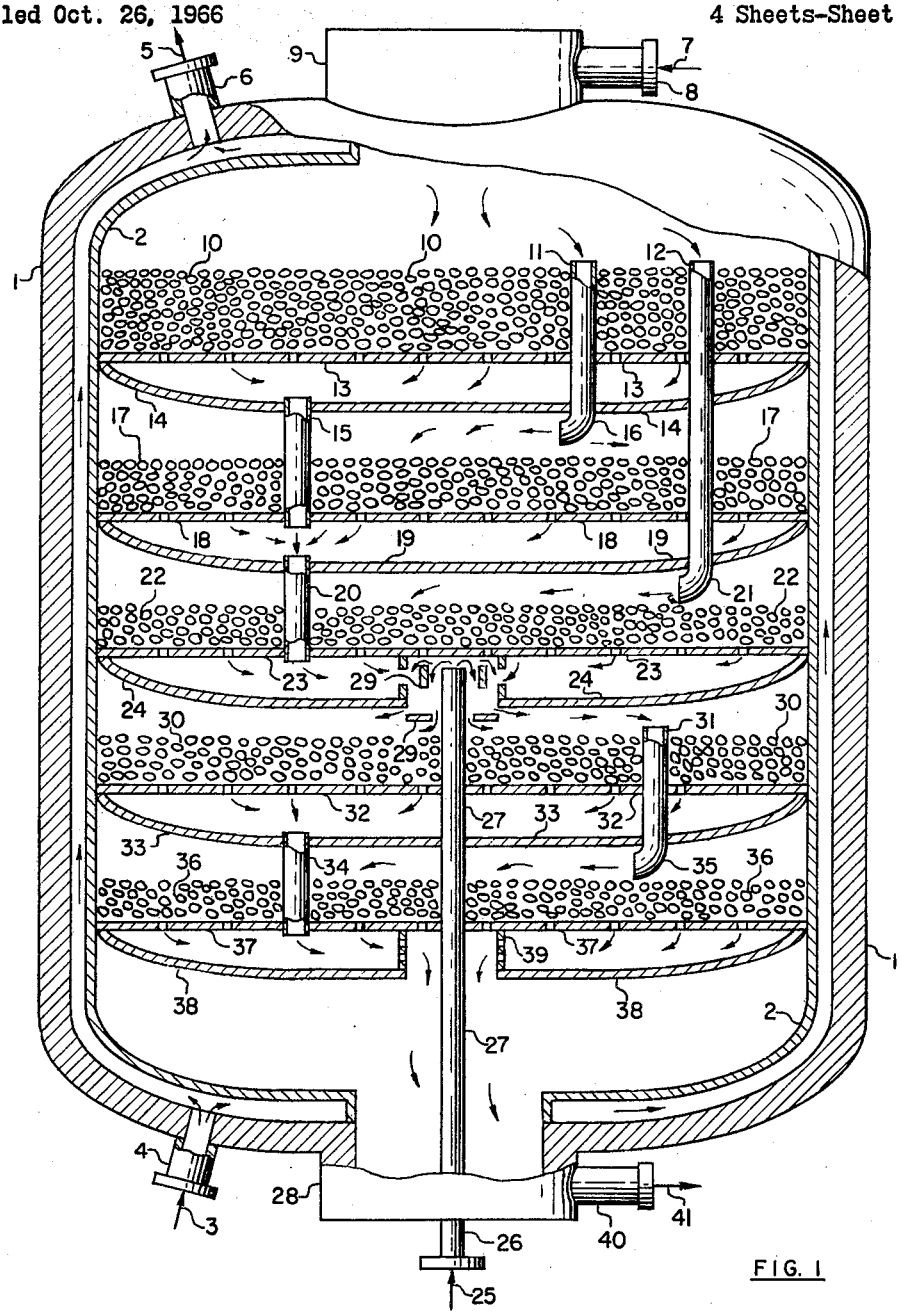

The present invention relates to apparatus for carrying out exothermic catalytic reactions, such as the catalytic synthesis of ammonia or methanol. An improved apparatus combination is provided, in which a fluid feed stream is passed in parallel through a vertical series of catalyst beds, with interbed quenching of the partially reacted fluid stream employing a cold quench fluid, followed by further catalytic reaction in a second vertical series of catalyst beds with parallel flow through the beds. In addition, an improved apparatus arrangement is provided for collecting a catalytically reacted stream portion between beds and passing the collected portion below the lower beds of the series, so as to provide improved apparatus for attaining parallel flow through a vertical series of catalyst beds.

Numerous types of fluids are processed by means of exothermic catalytic reactions. Among these may be mentioned the catalytic synthesis of ammonia from a nitrogen-hydrogen gas stream, and the catalytic synthesis of methanol from a hydrogen-carbon monoxide gas stream. Various types of converters or other apparatus have been provided in the prior art for carrying out these reactions, with a principal objective being the moderation of the stream temperature in the catalyst beds so as to achieve efficient reaction and to prevent damage to the catalyst by overheating.

The concept of circulating feed gas through tubes disposed in the catalyst bed for cooling purposes, prior to actual contact of the feed gas with the catalyst, has been shown in U.S. Patents Nos. 3,212,862; 3,050,377; 3,041,151 and 2,853,371. The alternative approach of providing cooling between stages by the introduction of a cold quench fluid into the partially reacted fluid stream between a series of stages of catalytic reaction is embodied in U.S. patent applications Nos. 498,872 filed Oct. 20, 1965, now U.S. Patent 3,433,600, and 366,347 filed May 11, 1964, now issued as U.S. Patent No. 3,366,461. In most instances, the quench fluid is of the same composition as the initial feed stream to the catalytic reactor. Although these apparatus arrangements have been effective in practice, they are open to certain practical objections such as cost and complexity of apparatus units and elements, and high pressure drop of the process fluid through the catalytic reactor. Other arrangements of catalyst beds and division of the process feed stream prior to entry into the beds are described in U.S. Patents Nos. 2,257,178 and 2,260,153.

The apparatus combination of the present invention is primarily intended for large size fixed bed catalytic reactors of the quench type, although some aspects of the apparatus described herein are applicable to the tube-cooled type of reactor. The apparatus handles fluid process streams of either gaseous or liquid phase or both. The reactor or converter includes one or more groups of catalyst beds enclosed in a single vertically oriented reactor vessel, the beds being placed in vertical series and spaced apart with one on top of the other, and the beds of each group are interconnected for parallel flow. The number of parallel beds in each group and the number of groups in a single vessel may be varied to suit individual conditions.

The interconnection of the parallel beds is achieved by the use of small and inexpensive pipes as downcomers for the feed and effluent streams. This enables the beds to share, equally or proportionally as desired, the common incoming feed stream and discharge the effluent into a common outlet through suitable collection means at the bed bottom such as the foraminous collecting channels of the present invention. The common outlet stream is then cooled by the addition of a cold quench fluid, and, after mixing the quench fluid with the outlet stream, the combined stream is led into another group of parallel flow catalyst beds for further reaction.

The preferred and novel apparatus for collecting reacted fluid below a first catalyst bed and passing this fluid to a common outlet below a second lower catalyst bed is also highly advantageous, in accomplishing gas collection with minimum pressure drop. This collection apparatus includes a substantially horizontal baffle which is disposed within the container or reactor between the first and second beds and spaced away from the first bed, a plurality of substantially rectangular gas collection channels which have foraminous upper and side walls and extend horizontally and radially between the baffle and the first bed, a plurality of retention particles disposed between the baffle and the first bed and external to the channels, and a plurality of ducts, with each duct extending downwards from one of the channels and terminating below the second catalyst bed.

The arrangement of a vertical series of beds with parallel flow, combined with intermediate quench, possesses numerous advantages. A great reduction of fluid pressure drop through the catalyst beds is attained, due to increase in flow area and decrease in length of flow path. In addition, a substantial reduction of catalyst basket diameter is attained, with consequent reduction in reactor vessel diameter, although the vessel is increased in length. As is well known to those skilled in the art, the essential factor in the cost of pressure vessels, high pressure vessels in particular, is vessel diameter rather than length, with a narrow elongated pressure vessel being far less costly than a wide short vessel of comparable volume. The reduction in vessel diameter also, in general, results in less total waste volume between catalyst beds, even though more stages and more interbed spaces are provided, since the interbed spaces are each of substantially reduced volume.

To illustrate the effect of pressure drop for given catalyst volume and catalyst basket diameter, the ratio of pressure drop for a conventional single path bed to that for a three-parallel-bed arrangement is 27:1. To illustrate the effect of diameter for given catalyst volume and pressure drop, the ratio of the basket diameter for a single path bed to that for a three-parallel-bed arrangement is 1.44:1, about the same ratio for the vessel diameters. Of course, the number of parallel beds and the basket diameter can easily be adjusted to meet practical considerations.

The great reduction in pressure drop allows the use of smaller compressors or gas circulators, thus resulting in savings in initial and utility costs; relatively higher recirculation rate with reduction in required catalyst volume and amount of purging; and lighter internal structural components, such as basket shell thickness, due to lower differential pressure between the feed and effluent streams. The reactor vessel shell is usually cooled by passing a cold feed stream through the annular space between the vessel wall and the basket assembly. The basket shell is therefore subjected to a differential external pressure.

The reduction in basket shell and vessel diameters also has significant advantages, including lower material and fabrication costs, especially for high pressure reaction; easier and faster fabrication and erection; and simpler shipping problems. Additionally, because of the use of a smaller diameter reactor vessel, it is sometimes economically feasible to have a flanged vessel closure so that a used catalyst basket assembly can be quickly removed and a spare assembly can be quickly reinstalled. This shortens the loss of production time.

In the quench type converter, the required catalyst volumes for various stages usually vary greatly from one stage to another. In the conventional series bed arrangement it is necessary to provide a basket diameter large enough in order to minimize the pressure drop through the larger beds. This in turn makes the smaller catalyst beds very shallow and consequently susceptible to poor fluid flow distribution in these shallow beds due to uneven bulk density of catalyst in the radial direction. The latter is mainly caused by the fluctuating differential thermal expansion between the catalyst bed and the basket shell. Uneven flow distribution not only will result in lower overall reaction efficiency but also may cause local overheating in the catalyst bed. The present invention permits the use of smaller basket diameter and thus avoids the difficulties of the shallow beds.

It is an object of the present invention to provide an improved apparatus for carrying out exothermic catalytic reactions.

Another object is to provide a multibed apparatus for exothermic catalytic reactions with reduced pressure drop.

A further object is to provide a multibed apparatus for exothermic catalytic reactions in which the beds are disposed in vertical series with parallel flow through the beds.

An additional object is to provide an apparatus for exothermic catalytic reactions in which a vertical series of beds is disposed in a contained of reduced diameter.

Still another object is to provide a multibed apparatus for exothermic catalytic reactions with parallel flow through a vertical series of beds and interbed quench.

Still a further object is to provide improved apparatus for collecting a reacted fluid stream below a catalyst bed which is in vertical series with a lower bed, and passing the reacted fluid through the lower bed so as to attain parallel flow through a vertical series of beds.

An object is to reduce the basket shell diameter so as to avoid the undesirable effects associated with the use of a shallow catalyst bed.

Figure 2:
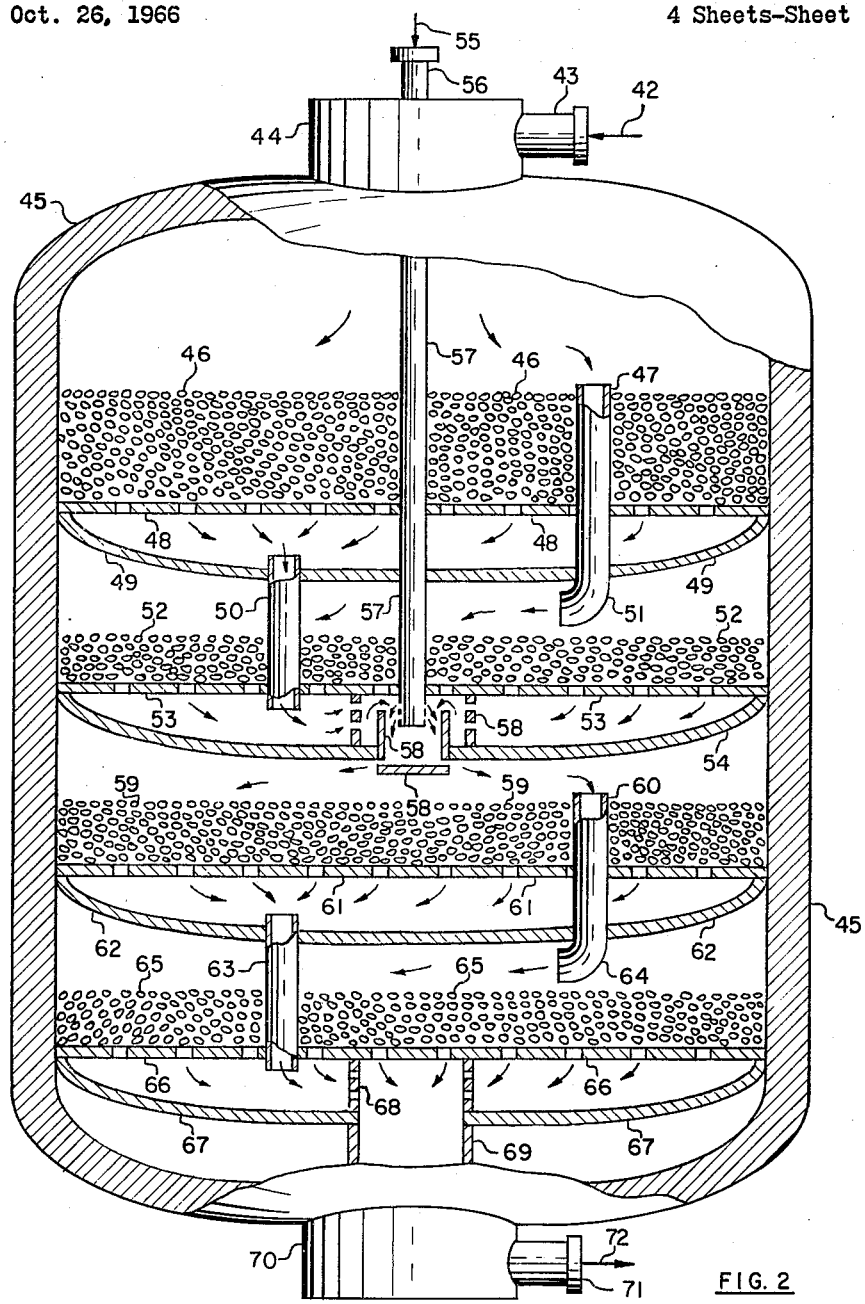
Figure 3:
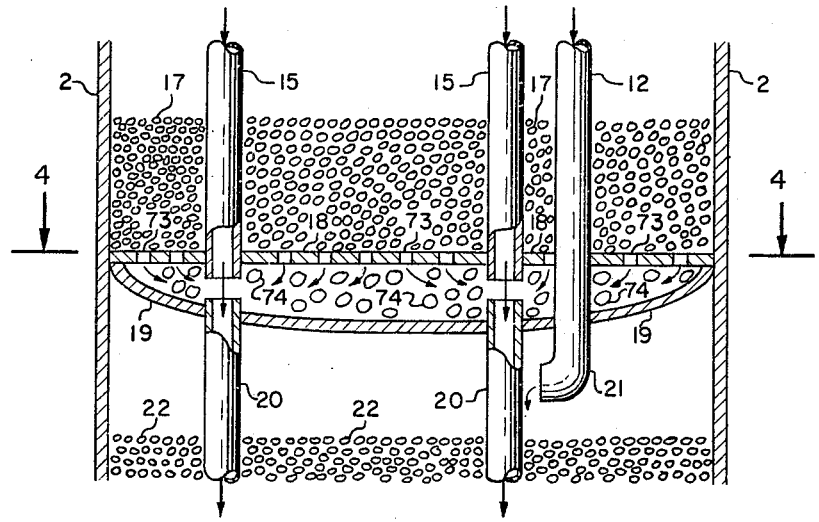
Figure 4:
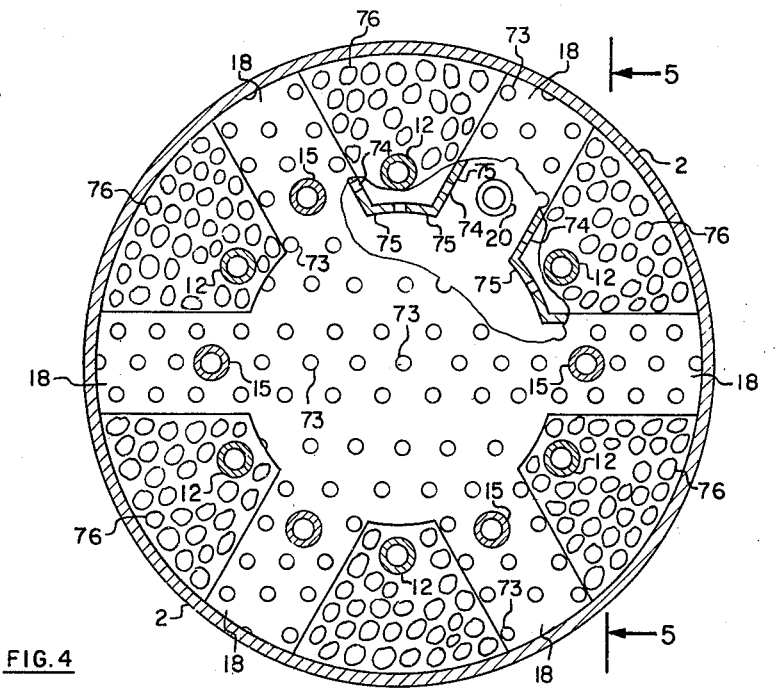
Figure 5:
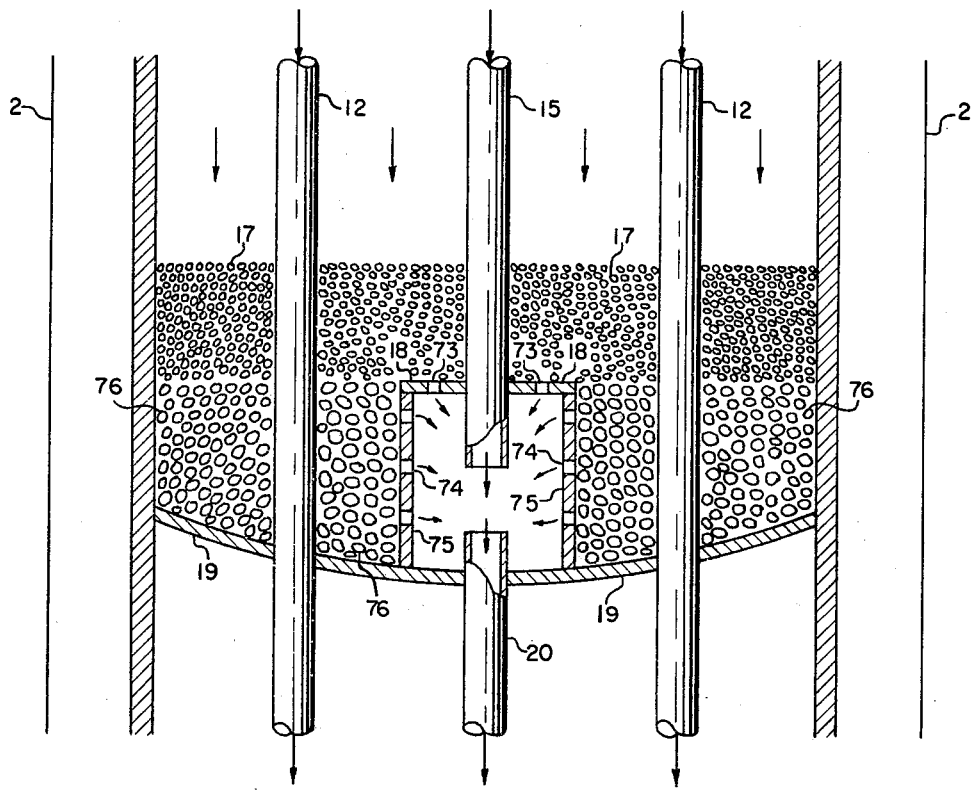

These and other objects and advantages of the present invention will become evident from the description which follows. Referring to the figures:

FIGURE 1 is a sectional elevation view of one embodiment of the apparatus of the invention, FIGURE 2 is a sectional elevation view of an alternative embodiment of the invention, FIGURE 3 is an enlarged sectional elevation view of the novel interbed reacted gas collection apparatus which is preferably provided between beds in the apparatus of FIGURES 1 and 2, and which provides for parallel fluid flow through a vertical series of beds, FIGURE 4 is a sectional plan view of FIGURE 3, taken on section 4—4, and FIGURE 5 is a sectional elevation view of a portion of FIGURE 4, taken on section 5—5.

Referring now to FIGURE 1, the exothermic catalytic reaction is carried out in the vertically oriented contained 1, which is typically a high pressure cylindrical vessel. Container 1 is usually provided with an internal basket shell 2, which is spaced away from the inner container wall so as to provide an annular void space for thermal insulation. A suitable cooling fluid stream 3, which may consist of all or a portion of the process fluid subsequently passed through vessel 1 for catalytic reaction, is passed via nozzle 4 into the void space between vessel 1 and shell 2, and circulates upwards so as to provide a cooling effect and protect the wall of vessel 1 from thermal stress and chemical attack at high tempertaure. Warmed cooling fluid stream 5 is discharged from nozzle 6. In order to control the catalyst bed temperature and to minimize thermal stress in the basket shell 2, this shell is usually also insulated, either externally or internally.

The main process fluid stream 7, such as ammonia synthesis gas or other gaseous or liquid stream to be subjected to exothermic catalytic reaction, is admitted via nozzle 8 into fitting 9 disposed on the top of vessel 1. Stream 7 is usually preheated through heat exchange with the hot reacted or catalytically converted stream discharged from container 1. Stream 7 thus flows into shell 2 within vessel 1, and divides into a plurality of portions. In the present instance, three portions of fluid are formed, with one portion flowing directly into catalyst bed 10 and the other two portions flowing into ducts 11 and 12, respectively. The process fluid portion flowing downwards through bed 10 is catalytically reacted, and the resultant reacted fluid stream flows downwards through perforations in the upper horizontal foraminous wall or plate 13 of the collecting channels to be described infra, and into the collecting channel space between wall 13 and substantially horizontal baffle 14, which is preferably somewhat arcuate and extends downwards and inwards from the inner wall of shell 2 towards the central vertical axis of container 1. As will appear infra, the baffle 14 serves a dual function, in that baffle 14 serves not only to divert the downflowing fluid portion but also to support the weight of, and fluid pressure drop through the catalyst bed 10. The reacted fluid portion is thus diverted by baffle 14 into substantially vertically oriented duct 15, and flows downwards through duct 15 for combination with additional reacted fluid portions as will appear infra.

The process fluid portion flowing downwards through duct 11 is discharged below baffle 14 through a lower terminus 16, which preferably curves horizontally to a feed fluid portion outlet opening. It is preferable that the lower terminus 16 curves horizontally and tangentially with respect to the central axis of the basket shell 2. This ensures more uniform temperature mixing of the feed before entering the catalyst and more uniform fluid flow distribution in the catalyst bed and prevents erosion of the catalyst particles due to direct impingement by the feed stream. The fluid portion flowing out of terminus 16 below baffle 14 now flows into catalyst bed 17, which is spaced vertically below bed 10. The process fluid portion flows downwards through bed 17 and is catalytically reacted, and the resultant reacted fluid stream flows downwards from bed 17 through perforations in the upper horizontal foraminous wall or plate 18 of the collecting channels to be described infra, and into the collecting channel space between wall 18 and baffle 19, which is similar to baffle 14 described supra. The reacted fluid portion from bed 17 is thus diverted by baffle 19 into duct 20, together with the reacted fluid portion discharged by duct 15, and both portions flow downwards through duct 20 for combination with an additional reacted fluid portion as will appear infra.

The process fluid portion flowing downwards through duct 12 is discharged below baffle 19 through a lower terminus 21, which is similarly curved as 16, described supra, and preferably curves horizontally to a feed fluid portion outlet opening. The fluid portion flowing out of terminus 21 below baffle 19 now flows into catalyst bed 22, which is spaced vertically below bed 17. The process fluid portion flows downwards through bed 22 and is catalytically reacted, and the resultant reacted fluid stream flows downwards from bed 22 through perforations in the upper horizontal foraminous wall or plate 23 of the collecting channels to be described infra, and into the collecting channel space between wall 23 and baffle 24, which is similar to baffle 14 described supra. The reacted fluid portion from bed 22 is thus diverted centrally by baffle 24, together with the reacted fluid portion discharged by duct 20. The reacted fluid flowing centrally between wall 23 and baffle 24 is at an elevated temperature due to exothermic catalytic reaction in beds 10, 17 and 22, and is now cooled by the mixing of a suitable quench fluid into the reacted fluid stream, prior to further catalytic reaction.

Referring now to the lower portion of vessel 1, quench fluid stream 25, which is at a relatively low temperature and is usually of the same composition as stream 7, is passed via nozzle 26 into duct 27. The quench fluid duct 27 extends vertically upwards from lower fitting 28, and is usually coaxially and centrally located with respect to vessel 1. The quench fluid is discharged from the upper outlet of duct 27, and mixes with the hot reacted fluid stream flowing centrally inwards above baffle 24. A plurality of mixing baffles 29 are suitably disposed adjacent to the outlet of duct 27, so as to attain rapid and uniform mixing of the process streams. The baffles 29 may be arranged in any suitable manner or combination, so as to achieve mixing of the fluid streams, however the baffles 29 will preferably be disposed in a configuration as described in the U.S. patent applications cited supra, so as to attain fluid mixing in an optimum manner.

The resultant cooled and combined fluid stream is discharged from baffles 29 below baffle 24, and now divides into two portions, with one stream portion flowing directly into catalyst bed 30 for further exothermic catalytic reaction and the other stream portion flowing into duct 31. The combined stream portion flowing downwards through bed 30 is catalytically reacted, and the resultant reacted fluid stream flows downwards from bed 30 through perforations in the upper horizontal foraminous wall or plate 32 of the collecting channels to be described infra, and into the collecting channel space between wall 32 and baffle 33, which is similar to baffle 14 described supra. The reacted fluid portion from bed 30 is thus diverted by baffle 33 into duct 34, and flows downwards through duct 34 for subsequent combination with the other combined stream portion after catalytic reaction, as will appear infra.

The combined process fluids portion flowing downwards through duct 31 is discharged below baffle 33 through a lower terminus 35, which is similarly curved as 16, described supra, and preferably curves horizontally to a fluid portion outlet opening. The fluid portion flowing out of terminus 35 below baffle 33 now flows into catalyst bed 36, which is spaced vertically below bed 30. The process fluid portion flows downwards through bed 30 and is catalytically reacted, and the resultant reacted fluid stream flows downwards from bed 36 through perforations in the upper horizontal foraminous wall or plate 37 of the collecting channels to be described infra, and into the collecting channel space between wall 37 and baffle 38, which is similar to baffle 14 described supra. The reacted fluid portion from bed 36 is thus diverted centrally by baffle 38, together with the reacted fluid portion discharged by duct 34. The reacted fluid flowing centrally between wall 37 and baffle 38, now fully reacted or catalytically converted, is passed through the perforations in support partitions 39, and flows downwards through fitting 28 for discharge via nozzle 40 as stream 41.

Referring now to FIGURE 2, an alternative embodiment of the invention is illustrated, in which interbed quench is attained in an alternative manner by the provision of a quench fluid duct which extends downwards into the vessel from an upper inlet. In addition, FIGURE 2 illustrates a more generalized application of the invention, in which a milder exothermic catalytic reaction is carried out and the catalyst basket shell of FIGURE 1 is omitted. Process fluid feed stream 42, which may be either a gaseous or liquid stream, is passed via nozzle 43 into fitting 44, which is disposed at the top of the vertically oriented contained 45. The fluid feed stream divides into two portions within vessel 45, with one portion passing through catalyst bed 46 and the other portion passing downwards through duct 47. The process fluid portion flowing downwards through bed 46 is catalytically reacted, and the resultant reacted fluid stream flows downwards through perforations in the horizontal foraminous wall 48 of the collecting channels, and into the collecting channel space between wall 48 and substantially horizontal baffle 49, which is preferably somewhat arcuate and extends downwards and inwards from the inner wall of container 45 towards the central vertical axis of the container 45. The baffle 49 is preferably similar to baffle 14 described infra, and as will appear infra, the baffle 49 serves a dual function of diverting the downflowing fluid portion and also supporting the catalyst bed 46. The reacted fluid is diverted by baffle 49 into the substantially vertically oriented duct 50, and flows downwards through duct 50 for combination with an additional reacted fluid portion as will appear infra.

The process fluid portion flowing downwards through duct 47 is discharged below baffle 49 through a lower terminus 51, which is similarly curved as 16, described supra, and preferably curves horizontally to a feed fluid portion outlet opening. The fluid portion flowing out of terminus 51 below baffle 49 now flows into catalyst bed 52, which is spaced vertically below bed 46. The process fluid portion flows downwards through bed 52 and is catalytically reacted, and the resultant reacted fluid stream flows downwards from bed 52 through perforations in horizontal foraminous wall 53, and into the collecting channel space between wall 53 and baffle 54, which is similar to baffle 49 described supra. The reacted fluid portion from bed 52 is thus diverted centrally by baffle 54, together with the reacted fluid portion discharged by duct 50. The reacted fluid flowing centrally between wall 53 and baffle 54 is at an elevated temperature due to exothermic catalytic reaction in beds 46 and 52, and is now cooled by the mixing of a suitable quench fluid into the reacted fluid stream, prior to further catalytic reaction.

Referring now to the upper portion of vessel 45, quench fluid stream 55, which is at a relatively low temperature and is usually of the same composition as stream 42, is passed via nozzle 56 into duct 57. The quench fluid duct 57 extends vertically downwards from upper fitting 44, and is usually coaxially and centrally located with respect to vessel 45. The quench fluid is discharged from the lower outlet of duct 57, and mixes with the hot reacted fluid stream flowing centrally inwards above baffle 54. A plurality of mixing baffles 58 are suitably disposed adjacent to the outlet of duct 57, so as to attain rapid and uniform mixing of the process streams. The baffles 58 may be arranged in any suitable manner or combination, so as to achieve mixing of the fluid streams, however the baffles 58 will preferably be disposed in a configuration as described in the U.S. patent applications cited supra, so as to attain fluid mixing in an optimum manner.

The resultant cooled and combined fluid stream is discharged from baffles 58 below baffle 54, and now divides into two portions, with one stream portion flowing directly into catalyst bed 59 for further exothermic catalytic reaction and the other stream portion flowing into duct 60. The combined stream portion flowing downwards through bed 59 is catalytically reacted, and the resultant reacted fluid stream flows downwards from bed 59 through perforations in the horizontal foraminous wall 61 of the collecting channels, and into the collecting channel space between wall 61 and baffle 62, which is similar to baffle 49 described supra. The reacted fluid portion from bed 59 is thus diverted by baffle 62 into duct 63, and flows downwards through duct 63 for subsequent combination with the other combined stream portion after catalytic reaction, as will appear infra.

The combined process fluids portion flowing downwards through duct 60 is discharged below baffle 62 through a lower terminus 64, which is similarly curved as 16, described supra, and preferably curves horizontally to a fluid portion outlet opening. The fluid portion flowing out of terminus 64 below baffle 62 now flows into catalyst bed 65, which is spaced vertically below bed 59. The process fluid portion flows downwards through bed 65 and is catalytically reacted, and the resultant reacted fluid stream flows downwards from bed 65 through perforations in the upper horizontal foraminous wall or plate 66 of the collecting channels to be described infra, and into the collecting channel space between wall 66 and baffle 67, which is similar to baffle 49 described supra. The reacted fluid portion from bed 65 is thus diverted centrally by baffle 67, together with the reacted fluid portion discharged by duct 63. The reacted fluid flowing centrally between wall 66 and baffle 67, now fully reacted or catalytically converted, is passed through the perforations in support partition 68, and flows downwards through central conduit 69 and through fitting 70 for discharge via nozzle 71 as stream 72.

Referring now to FIGURE 3, an enlarged sectional elevation view of the interbed reacted gas collection apparatus is illustrated. This apparatus is provided between beds in the apparatus of FIGURES 1 and 2, so as to provide for parallel fluid flow through a vertical series of beds, and will be described relative to the apparatus elements between beds 17 and 22 of FIGURE 1. It will be evident that the apparatus arrangement is generally applicable between beds with any number of beds arranged in vertical series with parallel flow. A plurality of ducts 15 is shown, for passing converted fluid downwards from bed 10, as well as a plurality of ducts 20, for passing converted fluid downwards from the collecting channel space between horizontal wall 18 and baffle 19. This converted fluid in ducts 20 includes fluid derived from bed 17 which passes through perforations 73 in wall 18 and perforations 74 in vertical side walls of the channels, as well as fluid derived from ducts 15. In addition, a single duct 12 is shown, however it will be understood that in practice a plurality of spaced apart ducts such as element 12 will be provided, for passing reactant fluid downwards to bed 22.

FIGURE 4 is a sectional plan view of FIGURE 3, taken on section 4—4, and shows the preferred arrangement of the fluid collecting channels which extend horizontally and radially within the cylindrical shell 2. The collecting channels are substantially horizontal and rectangular, and are defined by upper foraminous horizontal walls 18 and vertical side walls 75. As described supra, the upper walls 18 are provided with perforations 73 for fluid entry into the channels, while the side walls 75 are provided with perforations 74 for the same purpose. A plurality of retention particles 76 are provided in the sector space between walls 75 of adjacent collecting channels and external to ducts 12, in order to retain the catalyst bed in position above the horizontal wall 18 while permitting downwards flow of fluid to perforations 74 and thence lateral flow into the collecting channels. The retention particles 76 are thus disposed between the baffle 19 and the bed 17 and external to the collecting channel side walls 75, and the retention particles are of larger size than the catalyst particles in bed 17. The retention particles may consist of inert ceramic spheres, coarse-grained catalyst particles, or other suitable material of suitable particle shape such as Raschig rings or saddles for accomplishing the functions of permitting fluid flow downwards and laterally into the collecting channels, while retaining the catalyst bed. Thus, it will be apparent that the catalyst bed 17 is retained and supported by particles 76 and wall 18, which in turn are supported by baffle 19, and thus the baffle 19 serves to entirely support the weight of, and fluid pressure drop through the catalyst bed 17, the fluid collecting channels, and their appurtenances. In this manner, a novel combined support and gas diversion function is carried out by baffle 19.

Referring now to FIGURE 5, a sectional elevation view of FIGURE 4 taken on section 5—5 is presented. The rectangular nature of the fluid collecting channels is evident, as well as the arrangement of the plurality of ducts 12 external to the channels and the disposition of the ducts 15 and 20. Finally, the disposition of the retention particles 76 below the catalyst bed 17 is evident.

Numerous alternatives within the scope of the present invention will be evident to those skilled in the art, besides those mentioned supra. In instances such as illustrated in FIGURE 2, the catalyst basket shell 2 may be omitted and the converter or catalyst container may be externally cooled as required. In cases such as FIGURE 1 where the shell 2 is provided, the warmed circulating fluid stream 5 may be subsequently subjected to catalytic reaction as all or a portion of streams 7 or 25. The ducts 15 in suitable instances may not discharge into ducts 20, but instead the ducts 15 may extend downwards through baffle 19, bed 22 and wall 23 to a discharge outlet between wall 23 and baffle 24. The horizontally curved discharge outlets such as 16, 21 and 35 may be omitted in suitable instances, with the respective fluid portion being downwardly discharged and subsequently flowing directly into the respective bed 17, 22 or 36. The pressure fittings such as 9 and 28 may be omitted in suitable instances or replaced by alternative apparatus elements of comparable function known to the art. The arrangement shown in FIGURE 2, including two sets of catalyst bed in series with two beds in each set arranged for parallel flow, provides a preferred embodiment of the invention. Other groupings or numbers of parallel beds arranged in vertical series, such as the three beds 10, 17 and 22 of FIGURE 1, are also encompassed within the scope of the present invention. Suitable means such as baffles or partitions may be provided in practice to divide streams 7 or 42, or the intermediate quenched streams below baffles 24 or 54, into a plurality of portions.

I claim:

1. An apparatus for exothermic catalytic reactions comprising a vertically oriented container, a first plurality of catalyst beds disposed in vertical series within the upper portion of said container, means to pass a fluid feed stream into said container above the uppermost of said first plurality of catalyst beds, means to divide said feed stream into a plurality of portions, means to pass each of said feed stream portions through one of said first plurality of catalyst beds, whereby said feed stream flows in parallel through said first plurality of catalyst beds, means to collect a catalytically reacted stream portion below each of said first plurality of catalyst beds, means to combine said catalytically reacted stream portions below the lowest of said first plurality of catalyst beds, a quench fluid conduit, said conduit extending into said container and terminating below the lowest of said first plurality of catalyst beds, means to pass a quench fluid through said conduit whereby said quench fluid combines with and cools the combined catalytically reacted stream below the lowest of said first plurality of catalyst beds, a second plurality of catalyst beds disposed in vertical series within the lower portion of said container and below the lowest of said first plurality of catalyst beds, means to divide the combined stream below the lowest of said first plurality of catalyst beds into a plurality of portions, means to pass each of said combined stream portions through one of said second plurality of catalyst beds, whereby said combined stream flows in parallel through said second plurality of catalyst beds, means to collect a catalytically reacted stream portion below each of said second plurality of catalyst beds, means to combine said catalytically reacted stream portions below the lowest of said second plurality of catalyst beds to form a fully reacted process fluid stream, and means to remove the fully reacted process fluid stream from said container.

2. The apparatus of claim 1, in which said quench fluid conduit extends vertically and coaxially into said container.

3. The apparatus of claim 1, in which said means to pass one of said feed stream portions through one of said first plurality of catalyst beds below the uppermost of said first beds comprises at least one duct, said duct extending vertically downwards through the uppermost of said first beds and terminating above one of said first plurality of beds below the uppermost bed.

4. The apparatus of claim 3, in which said duct is provided with a lower terminus which curves horizontally to a feed stream portion outlet opening.

5. The apparatus of claim 1, in which said means to pass one of said combined stream portions through one of said second plurality of catalyst beds below the uppermost of said second beds comprises at least one duct, said duct extending vertically downwards through the uppermost of said second beds and terminating above one of said second plurality of beds below the uppermost bed.

6. The apparatus of claim 5, in which said duct is provided with a lower terminus which curves horizontally to a combined stream portion outlet opening.

7. The apparatus of claim 1, in which the number of beds in said first plurality of catalyst beds is two, and the number of beds in said second plurality of catalyst beds is two.

8. The apparatus of claim 1, in which said means to collect a catalytically reacted stream portion below each of said first and second plurality of catalyst beds comprises a substantially horizontal baffle, said baffle being disposed within said container below a catalyst bed and spaced away from said bed, a plurality of substantially, rectangular gas collection channels, said channels having foraminous upper and side walls and extending horizontally and radially between said baffle and said bed, and a plurality of retention particles, said particles being disposed between said baffle and said bed and external to said channels, said particles being of larger particle size than the catalyst particles in said catalyst bed.

9. The apparatus of claim 8, in which said baffle is arcuate, and extends downwards and inwards from the wall of said container towards the central vertical axis of said container.

10. The apparatus of claim 8, in which said retention particles comprise coarse-grained catalyst particles.

11. The apparatus of claim 8, in which said retention particles comprise ceramic spheres.

12. In an apparatus for exothermic catalytic reactions comprising a vertically oriented container, a plurality of catalyst beds disposed in vertical series within said container, said plurality of catalyst beds including a first bed and a second bed, said second bed being disposed below said first bed, means to pass a fluid feed stream into said container above the uppermost bed, means to divide said feed stream into a plurality of portions, means to pass a first portion of said feed stream to said first bed, means to pass a second portion of said feed stream to said second bed, and means to remove a catalytically reacted stream below the lowest bed, the improved apparatus for collecting a catalytically reacted stream portion below said first bed and passing said catalytically reacted stream portion below said second bed, whereby said first and second feed stream portions flow downwards through the respective first and second catalyst beds in parallel, which comprises a substantially horizontal baffle, said baffle being disposed within said container between said first and said second catalyst beds and spaced away from said first bed, a plurality of substantially rectangular gas collection channels, said channels having foraminous upper and side walls and extending horizontally and radically between said baffle and said first bed, a plurality of retention particles, said particles being disposed between said baffle and said first bed and external to said channels, said particles being of larger particle size than the catalyst particles in said first catalyst bed, and a plurality of ducts, each of said ducts extending downwards from one of said channels and terminating below said second catalyst bed, whereby catalytically reacted first stream portions pass from said first bed into said channels and downwards through said ducts to a discharge opening below said second catalyst bed.

13. The apparatus of claim 12, in which said baffle is arcuate, and extends downwards and inwards from the wall of said container towards the central vertical axis of said container.

14. The apparatus of claim 12, in which said retention particles comprise coarse-grained catalyst particles.

15. The apparatus of claim 12, in which said retention particles comprise ceramic spheres.

References Cited

UNITED STATES PATENTS

| | | | |
|---|---|---|---|
| 2,315,525 | 4/1943 | Hulsberg | 23—288 |
| 2,317,449 | 4/1943 | Flock | 23—288 |
| 2,512,586 | 6/1950 | Stengel | 23—288.9 |
| 3,366,461 | 1/1968 | Christensen | 23—289 |
| 3,442,626 | 5/1969 | Browne | 23—289 X |

JOSEPH SCOVRONEK, Primary Examiner

U.S. Cl. X.R.

23—288